United States Patent Office 3,477,229
Patented Nov. 11, 1969

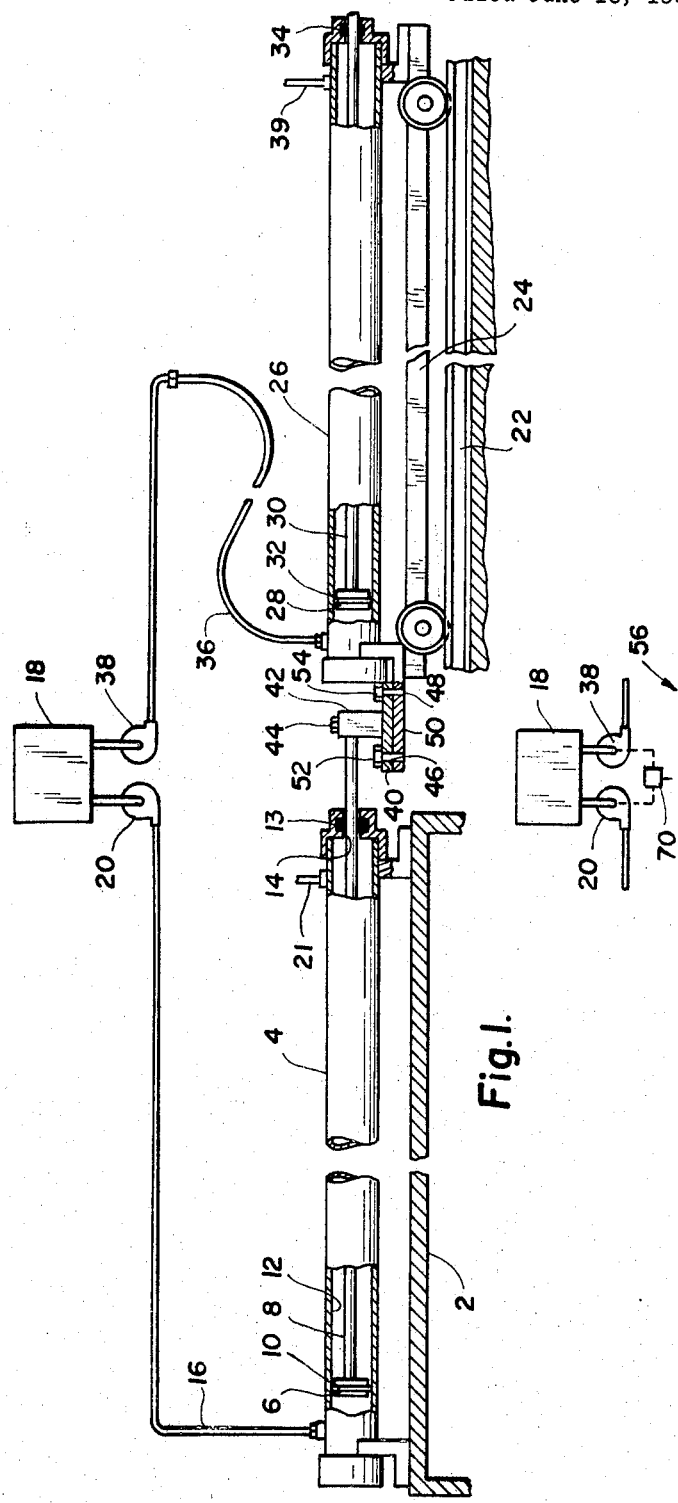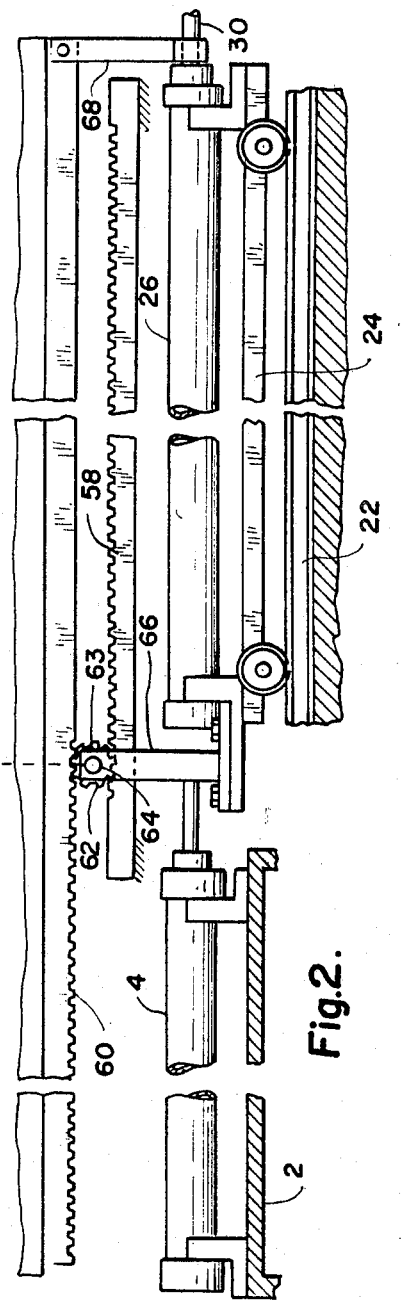

3,477,229
HYDRAULIC CYLINDER ARRANGEMENT
Daniel A. Katko, Hubbard, Ohio, assignor to Lombard Corporation, Youngstown, Ohio, a corporation of Ohio
Filed June 16, 1967, Ser. No. 646,596
Int. Cl. F15b *11/18;* F02b *73/00;* F01b *15/02*
U.S. Cl. 60—52                                                       3 Claims

ABSTRACT OF THE DISCLOSURE

This patent discloses equipment that makes possible higher effective piston speeds in hydraulic apparatus. Possible damage to the packing between a hydraulic cylinder and either the piston rod or the piston itself limits the maximum permissible speed that the piston of a hydraulic cylinder may move, relative to its cylinder, to about 200 to 250 feet per minute. In accordance with the invention, there is described equipment whereby high effective speeds such as 500 feet per minute or possibly more are obtained, by providing a fixed cylinder and one or more cylinders movable on a carriage or upon ways, the movable cylinder or cylinders being propelled directly or indirectly by a piston associated with the fixed cylinder. Fluid is simultaneously pumped into both the fixed cylinder and the movable cylinder or cylinders, and at a rate with respect to each of the cylinders involved such that there exists a predetermined ratio of the speed of travel of each piston with respect to its associated cylinder, usually but not necessarily 1:1; and also a predetermined ratio between the speed of travel of the piston in the fixed cylinder with respect to its cylinder and the speed of travel of the piston in each movable cylinder with respect to a fixed location, e.g., 2:1, 3:1, or possibly more. In accordance with still a more limited aspect of the invention, there is further provided means for insuring that a propelled cylinder does not outrun the cylinder by means of which it is propelled, e.g., a rack-and-pinion arrangement.

BACKGROUND OF THE INVENTION

Field of the invention

The invention relates to a hydraulic cylinder arrangement that permits the attainment of piston speeds, relative to a fixed location, substantially in excess of anything hitherto achieved. This makes it possible to use hydraulic means as a prime mover in such applications as catapults, fast-moving elevators and hoists, etc.

Description of the prior art

Prior to the present invention, the use of hydraulic means as a prime mover has been limited to applications involving a relatively short stroke and a relatively slow speed of travel. The reasons for this are easy to understand. In a hydraulic cylinder, there is packing between the piston and rod and the place that it leaves the cylinder, and there is more packing between the piston and the interior barrel wall of the cylinder. While known kinds of packing give satisfactory results at piston speeds relative to the cylinder of up to about 200 or 250 feet per minute, the packing tends to fail rapidly whenever the piston is moved at any greater speed. Replacing the packing in the event of its failure necessitates a shutdown of the equipment, and such shutdowns are economically intolerable except in the most unusual circumstances. Moreover, the use of a hydraulic cylinder as a prime mover has hitherto been limited to applications not involving a stroke of more than about 50 feet. The reason is that with one cylinder the piston rod must be at least as long as the stroke, and with a piston rod about 50 feet or more in length, the rod tends to sag or buckle. This problem is one that can be alleviated only to a relatively minor extent by such measures as increasing the rod diameter, making the rod of stronger and more expensive material, and providing supports for the rod in its extended position.

BRIEF SUMMARY OF THE INVENTION

According to the instant invention, the above-indicated problems are overcome by providing a fixed cylinder and one or more cylinders movable on a carriage or on ways, the movable cylinder or cylinders being propelled directly or indirectly by a piston associated with the fixed cylinder. Fluid is simultaneously pumped into both the fixed cylinder and the movable cylinder or cylinders, and at a rate with respect to each of the cylinders involved such that there exists a predetermined ratio of the speed of travel of each piston with respect to its associated cylinder, usually but not necessarily 1:1, and also a predetermined ratio between the speed of travel of the piston in the fixed cylinder with respect to its cylinder and the speed of travel of the piston in each movable cylinder with respect to a fixed location, e.g., 2:1, 3:1, or possibly more. In accordance with still a more limited aspect of the invention, there is further provided means for insuring that the propelled cylinder does not outrun the cylinder by means of which it is propelled, e.g., a rack-and-pinion arrangement.

DESCRIPTION OF THE DRAWINGS

A complete understanding of the invention may be obtained from the foregoing and ensuing description thereof, taken in conjunction with the appended drawings, in which:

FIG. 1 is an elevation view, partly in section, of apparatus in accordance with the instant invention; and FIG. 2 is a detailed view of a portion of the apparatus of FIG. 1, showing a modified structure in accordance with the instant invention.

DETAILED DESCRIPTION

Referring now to the drawings, and in particular to FIG. 1, there is shown a frame 2, upon which there is supported a fixed cylinder 4 having an associated piston 6 and piston rod 8. Packing 10 is provided between the piston 6 and the interior wall 12 of the cylinder 4. Packing 13 is provided between the piston rod 8 and the opening 14 at one end of the cylinder 4. Fluid is supplied to the cylinder 4 by means of a flexible or telescoping pipe 16 leading from the fluid reservoir 18 and a pump 20. Fluid leaves the cylinder 4 by means of a line 21 and is returned to the reservoir 18 by conventional means (not shown). The apparatus of the invention further comprises a track 22, upon which there is set a carriage 24, and riding upon the carriage 24 is a second hydraulic cylinder 26. Cylinder 26 has a piston 28, a piston rod 30, piston packing 32 and piston-rod packing 34. Cylinder 26 is likewise supplied with fluid by means of a flexible or telescoping pipe 36 leading from the reservoir 18 and a pump 38. A line 39 is provided for returning fluid to reservoir 18 by conventional means (not shown). The piston rod 8 is connected or attached to the carriage 24. This may be done by any convenient means, such as a plate 40 having a collar 42 that is secured to the rod 8 by means of a set screw 44, the plate having openings 46 that register with openings 48 in a plate 50 welded to or integral with the carriage 24, so that the two plates 40 and 50 may be joined by bolts 52 and 54. Advantageously, but not necessarily, the piston rods 8 and 30 are about 50 feet in length. Of course, the piston rod 8 may also bear directly upon an end of the cylinder 26, the latter being affixed to the carriage 24. This completes the description of apparatus in accordance with the invention in its broadest aspect.

In accordance with the invention in its broadest aspect, the apparatus described above is operated in the following manner. With the piston rods 8 and 30 being substantially completely retracted, fluid is pumped from the source 18 by means of the pumps 20 and 38 to the cylinders 4 and 26, the pumps operating to move the fluid at such a rate that each of the pistons 6 and 28 is moved within its cylinder at about 150 to 200 feet per minute or possibly a little more. It will be appreciated that, with respect to a fixed location, the piston rod 30 is thus made to travel at about 300 to 400 feet per minute. Moreover, such high speeds can be achieved in repeated use of the apparatus without detriment to the piston packing or the piston-rod packing, as each piston is moved at a speed, with respect to its associated cylinder, within a speed range that is acceptable and consonant with good packing life. It wil be appreciated, moreover, that the effective stroke of piston rod 30, if piston rods 8 and 30 are each 50 feet long, is 100 feet. Moreover, the force exerted by the rod 30 is about double that which can be obtained with the use of a single cylinder and piston of the same dimensions and the same fluid pressure.

It will be seen that the invention is not necessarily limited to use of one fixed and one movable cylinder. To reach still higher speeds or longer strokes, two, three or even a greater number of movable cylinders might be used.

In accordance with a preferred aspect of the invention, there is also provided means for keeping the speeds of travel of the piston rods 8 and 30, with respect to a fixed point, in a predetermined ratio with each other. In accordance with this aspect of the invention, there is provided a rack-and-pinion arrangement 56 comprising a set of fixed teeth 58, a set of movable teeth 60, and a pinion 62 journaled in a bearing 63 for rotation about a shaft 64 and received within an arm 66 attached to the carriage 24 or the second hydraulic cylinder 26. A second arm 68 connects the piston rod 30 with the set of movable teeth 60. It will thus be seen that if the pump 38 is not supplying fluid to the cylinder 26 at a rate very close to that at which the pump 20 is supplying fluid to the cylinder 4, the rack-and-pinion arrangement 58 will act to restrain, as the case may be, an appropriate one of the pistons 6 and 28 and correspondingly urge the other one forward, thereby tending to equalize the rate of flow achieved by the two pumps 20 and 38.

In accordance with a further refinement of the rack-and-pinion arrangement 58, there is provided, as further shown in FIG. 2, associated with the bearings 63, a load cell 70, which serves to sense the strains imposed upon the pinion 62, the load cell 70 being connected to means for stopping, altogether or for a preselected time, the operation of one or both of the pumps 20 and 38. The load cell 70 may operate either as a control device for insuring proper matching of speeds between the piston 6 and the piston 28 or as a safety device, in the event of failure of one of the pumps 20 and 38, to shut down the other said pumps and thereby avoid damage to the equipment.

It is preferable, moreover, to insert in the lines 16 and 36 by which fluid is conveyed to the cylinders 4 and 26 pressure transducers connected to control means for varying the volumetric flow rate produced by one or both of the pumps 20 and 38, to insure that each cylinder 4 and 26 does substantially the same amount of work and to compensate for any leakage developing in the cylinders or the pumps as a result of fabrication tolerances or normal wear.

While I have shown and described herein certain embodiments of my invention, I intend to cover as well any change or modification therein which may be made without departing from the spirit and scope of the invention.

I claim as my invention:

1. Hydraulic cylinder apparatus comprising, in combination,
   a first hydraulic cylinder having an associated piston and piston rod,
   a second hydraulic cylinder having an associated piston and piston rod,
   means for causing said second hydraulic cylinder to travel along a rectilinear path,
   means for simultaneously feeding hydraulic fluid to each of said cylinders, and
   means connecting the piston rod associated with said first cylinder with said means for causing said second cylinder to travel along said rectilinear path,
   said apparatus having an effective stroke substantially in excess of 50 feet,
   said apparatus being characterized in that the piston rod associated with said first cylinder and the piston rod associated with said second cylinder are each about 30 to 50 feet in length,
   said apparatus further comprising means for matching the speed of travel of the piston rod associated with said first cylinder and the speed of travel of the piston rod associated with said second cylinder,
   said speed-matching means comprising a rack-and-pinion arrangement including
      a set of fixed teeth,
      a set of movable teeth,
      an arm operatively connected to said means for causing said second cylinder to travel along a rectilinear path,
      a pinion operatively engaging both said fixed set of teeth and said movable set of teeth and journaled for rotation about a shaft in said arm, and
      means connecting said movable set of teeth operatively with said piston associated with said second cylinder.

2. Apparatus as defined in claim 1, including, in addition, a load cell associated with said shaft of said pinion, and means responsive to indications emitted by said load cell for decelerating the action of a pump supplying fluid to one of said cylinders.

3. Apparatus as defined in claim 2, characterized in that said means for decelerating the action of said pump includes a timer operative for a short preselected time to decelerate one of said pumps supplying fluid to one of said cylinders.

References Cited

UNITED STATES PATENTS

| | | | |
|---|---|---|---|
| 531,723 | 1/1895 | Hill | 308—6 |
| 761,339 | 5/1904 | Thomas | 308—4 |
| 1,900,050 | 3/1933 | Ernst. | |
| 2,146,346 | 2/1939 | Nelson | 92—117 XR |
| 2,568,228 | 9/1951 | Forse | 92—117 XR |
| 3,187,637 | 6/1965 | Edmund | 91—167 |

EDGAR W. GEOGHEGAN, Primary Examiner

U.S. Cl. X.R.

60—97; 91—167, 411; 92—117